United States Patent [19]
Jung

[11] Patent Number: 5,838,778
[45] Date of Patent: Nov. 17, 1998

[54] RESERVED SPEECH PATH FORMING METHOD IN A PARALLEL-CONNECTED TELEPHONE SYSTEM

[75] Inventor: Sung-Ha Jung, Goomi, Rep. of Korea

[73] Assignee: SamSung Electronics Co., Ltd., Kyungki-do, Rep. of Korea

[21] Appl. No.: 588,982

[22] Filed: Jan. 19, 1996

[30] Foreign Application Priority Data

Apr. 26, 1995 [KR] Rep. of Korea ..................... 9971/1995

[51] Int. Cl.$^6$ ................................. H04M 13/00
[52] U.S. Cl. ............................ 379/182; 379/40; 379/177; 379/179; 379/456
[58] Field of Search .................................. 379/156, 165, 379/164, 166, 167, 133, 182, 382, 377, 130, 140, 141, 179, 199, 200, 137, 168, 184, 183, 194, 195, 161, 40, 445, 448, 456; 340/825.48, 825.5

[56] References Cited

U.S. PATENT DOCUMENTS

| | | |
|---|---|---|
| 4,368,358 | 1/1983 | Herschtal . |
| 4,546,214 | 10/1985 | Laing . |
| 4,899,372 | 2/1990 | Wahi et al. ............................. 379/168 |
| 5,187,736 | 2/1993 | Moriizumi .............................. 379/100 |
| 5,283,825 | 2/1994 | Druckman et al. ..................... 379/194 |
| 5,388,153 | 2/1995 | Burger et al. ........................... 379/156 |
| 5,414,764 | 5/1995 | Watanabe et al. ...................... 379/377 |
| 5,422,947 | 6/1995 | Azem ...................................... 379/164 |
| 5,465,297 | 11/1995 | Azem ......................................... 379/40 |
| 5,521,974 | 5/1996 | Hayashi et al. .......................... 379/133 |
| 5,533,117 | 7/1996 | Kim ......................................... 379/164 |

*Primary Examiner*—Curtis A. Kuntz
*Assistant Examiner*—Binh K. Tieu
*Attorney, Agent, or Firm*—Robert E. Bushnell, Esq.

[57] ABSTRACT

A reserved speech path forming method according to a first embodiment includes the steps of: determining whether or not another telephone within a parallel-connected telephone system is being used, enabling input of a reserved function key to reserve the speech path when another telephone within the parallel-connected telephone system is being used, providing a dial tone and enabling input of a reserved telephone number upon completion of use of the other telephone within the parallel-connected telephone system, dialing the reserved telephone number, and forming the reserved speech path. A reserved speech path forming method according to a second embodiment includes the steps of: determining whether or not another telephone within a parallel-connected telephone system is being used, enabling input of a reserved function key to reserve the speech path when another telephone within the parallel-connected telephone system is being used, storing a reserved telephone number input by a user, and automatically dialing the reserved telephone number and forming the reserved speech path upon completion of use of the other telephone within the parallel-connected telephone system.

16 Claims, 4 Drawing Sheets

5,838,778

RESERVED SPEECH PATH FORMING METHOD IN A PARALLEL-CONNECTED TELEPHONE SYSTEM

CROSS-REFERENCE TO RELATED APPLICATIONS

This application makes reference to, incorporates the same herein, and claims all benefits accruing under 35 U.S.C. §119 from an application for Reserved Speech Path Forming Method In A Parallel-Connected Telephone System earlier filed in the Korean Industrial Property Office on Apr. 26, 1995 and there assigned Ser. No. 9971/1995.

BACKGROUND OF THE INVENTION

The present invention relates to parallel-connected telephone sets, and more particularly, to a method for forming a reserved speech path in a parallel-connected telephone system. According to the principles of the present invention, when a first telephone set within the system is in an on-line state, the speech path can be reserved for a second telephone set within the system. Upon completion of use of the speech path by the first telephone set, the speech path reserved for the second telephone set is formed.

With the ongoing development of communication techniques, various service functions for communication equipment are being required by users, and various speech path forming methods for office telephone systems have been utilized.

Generally, in a conventional parallel-connected telephone system, when a first user is using his or her telephone, and a second user within the system lifts his or her handset (i.e., performs an "off-hook") in an attempt to place an outgoing call, unnecessary noise is generated for the first user and speech sensitivity is deteriorated.

Furthermore, since the second user may repeatedly lift his or her handset to check the line status and place the outgoing call, the first user may be periodically inconvenienced by such disruptions.

One prior art reference seeking to eliminate this problem is disclosed in U.S. Pat. No. 4,546,214 entitled Line Use Indicator For Telephone Sets Sharing A Single Line issued to Laing. In Laing '214, a user is provided with a visual indication that a common telephone line is in use to avoid having a user lift a handset to see if there is a conversation. While this type of conventional art is useful in its own right, I note that it fails to aid a user in placing a call after the common telephone line becomes free.

SUMMARY OF THE INVENTION

It is therefore an object of the present invention to provide a reserved speech path forming method for overcoming the foregoing disadvantages.

It is another object to provide a reserved speech path forming method for forming a speech path by automatically dialing a reserved telephone number upon completion of use of the speech path by another one of the telephones in a parallel-connected telephone system.

It is still another object to provide a reserved speech path forming method that informs a user via his or her telephone that another telephone within a parallel-connected telephone system is using the telephone line.

These and other objects can be achieved according to a first embodiment of the present invention with a reserved speech path forming method comprising the steps of: determining whether or not another telephone within a parallel-connected telephone system is being used, enabling input of a reserved function key to reserve the speech path when another telephone within the parallel-connected telephone system is being used, providing a dial tone and enabling input of a reserved telephone number upon completion of use of the other telephone within the parallel-connected telephone system, dialing the reserved telephone number, and forming the reserved speech path.

These and other objects can also be achieved according to a second embodiment of the present invention with a reserved speech path forming method comprising the steps of: determining whether or not another telephone within a parallel-connected telephone system is being used, enabling input of a reserved function key to reserve the speech path when another telephone within the parallel-connected telephone system is being used, storing a reserved telephone number input by a user, and automatically dialing the reserved telephone number and forming the reserved speech path upon completion of use of the other telephone within the parallel-connected telephone system.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENTS

Figure 1:
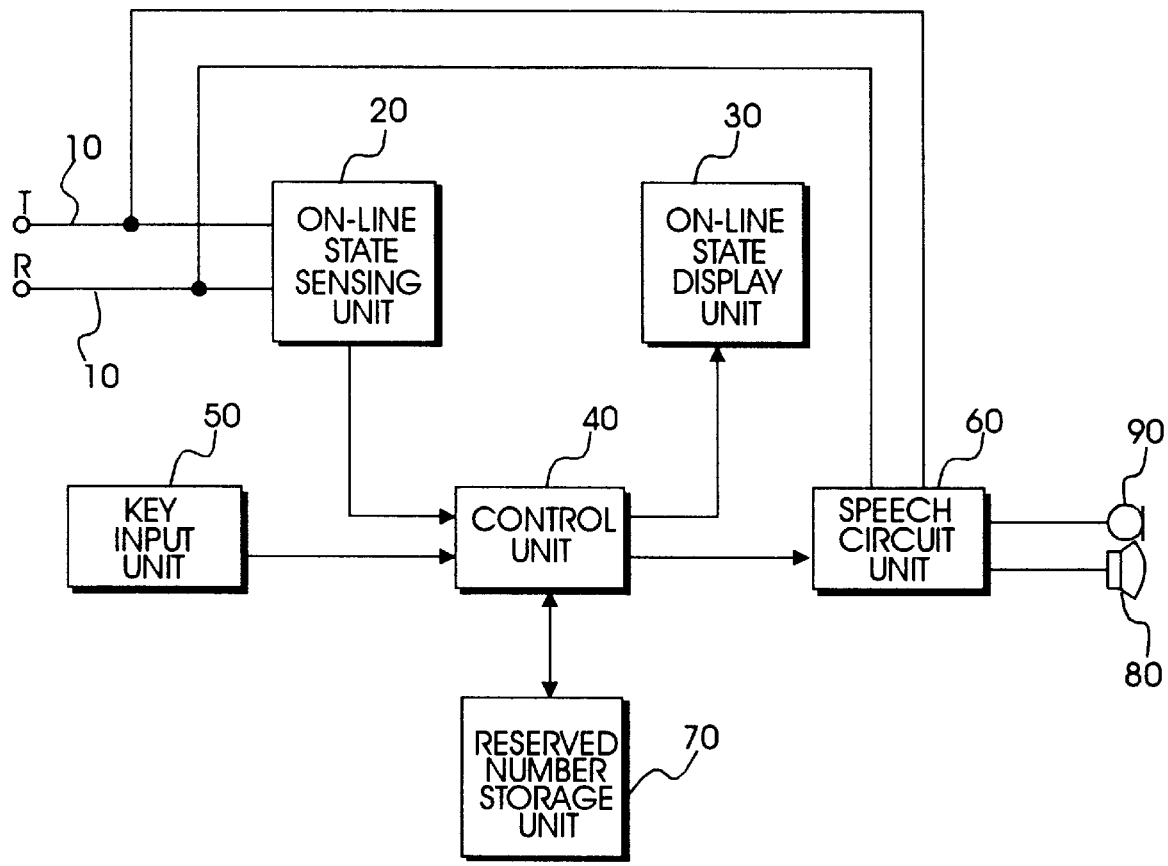
FIG. 1 is a block diagram of a general telephone used in the parallel-connected telephone system according to the principles of the present invention.

Turning now to the drawings and referring to FIG. 1, a block diagram of a general telephone used in the parallel-connected telephone system according to the principles of the present invention is shown. A plurality of the general telephones shown in FIG. 1 are connected in parallel and share a common telephone line (i.e., speech path) to make up the parallel-connected telephone system. The telephone of FIG. 1 includes a key input unit 50 having numeric keys and various function keys for enabling inputs, such as the digits of a telephone number, and generating signals corresponding to the inputs. An on-line state sensing unit 20 senses, via parallel-connected telephone lines (T,R) 10, whether or not any of the other telephones within the system are being used. An on-line state display unit 30 provides display of a message indicating the on-line state when another telephone within the parallel-connected telephone system is being used. A control unit 40 enables display of the message indicating the on-line state on on-line state display unit 30 in response to a signal provided from on-line state sensing unit 20. A reserved number storage unit 70 receives a control signal provided from control unit 40, and has a dial buffer for storing a reserved telephone number to be dialed. A speech circuit unit 60 receives the control signal provided from control unit 40 and forms a speech path. Speech circuit unit 60 is connected to a speaker 80 and a microphone 90.

Figure 2:
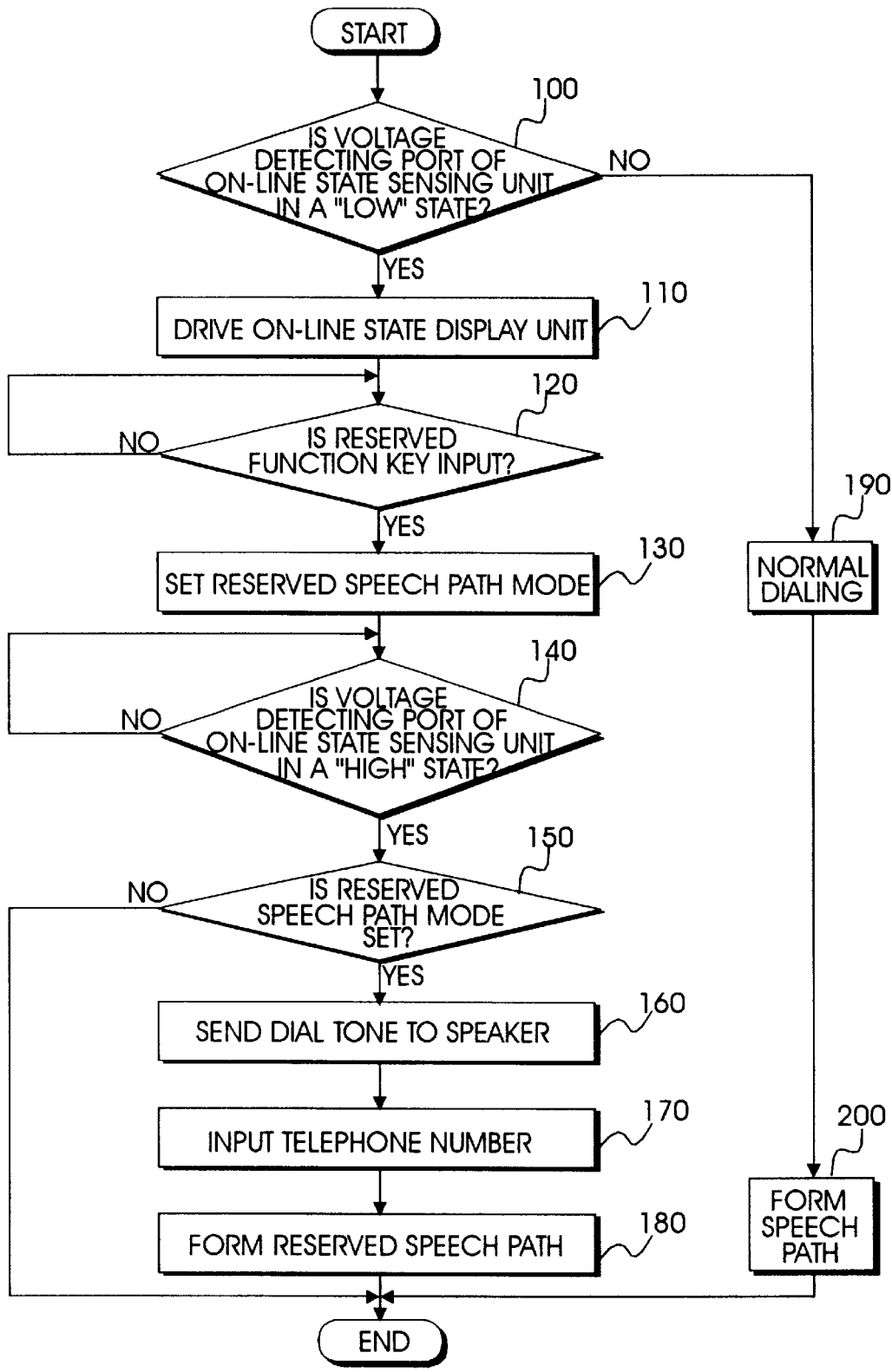
FIG. 2 is a flow chart illustrating a reserved speech path forming method for the general telephone in accordance with a first embodiment of the present invention.

FIG. 2 is a flow chart illustrating a reserved speech path forming method for the general telephone within the parallel-connected telephone system according to a first embodiment of the present invention. According to FIG. 2, when a first telephone within the parallel-connected telephone system is in the on-line state, and the user of a second telephone within the system who desires to use his telephone inputs a reserved function key via key input unit 50, control unit 40 sets a reserved speech path mode. Then, when use of the first telephone is completed, a dial tone is transmitted to speaker 80 of the second telephone. The user of the second telephone can then input a telephone number, via key input unit 50, so that control unit 40 forms the reserved speech path.

Figure 3A:
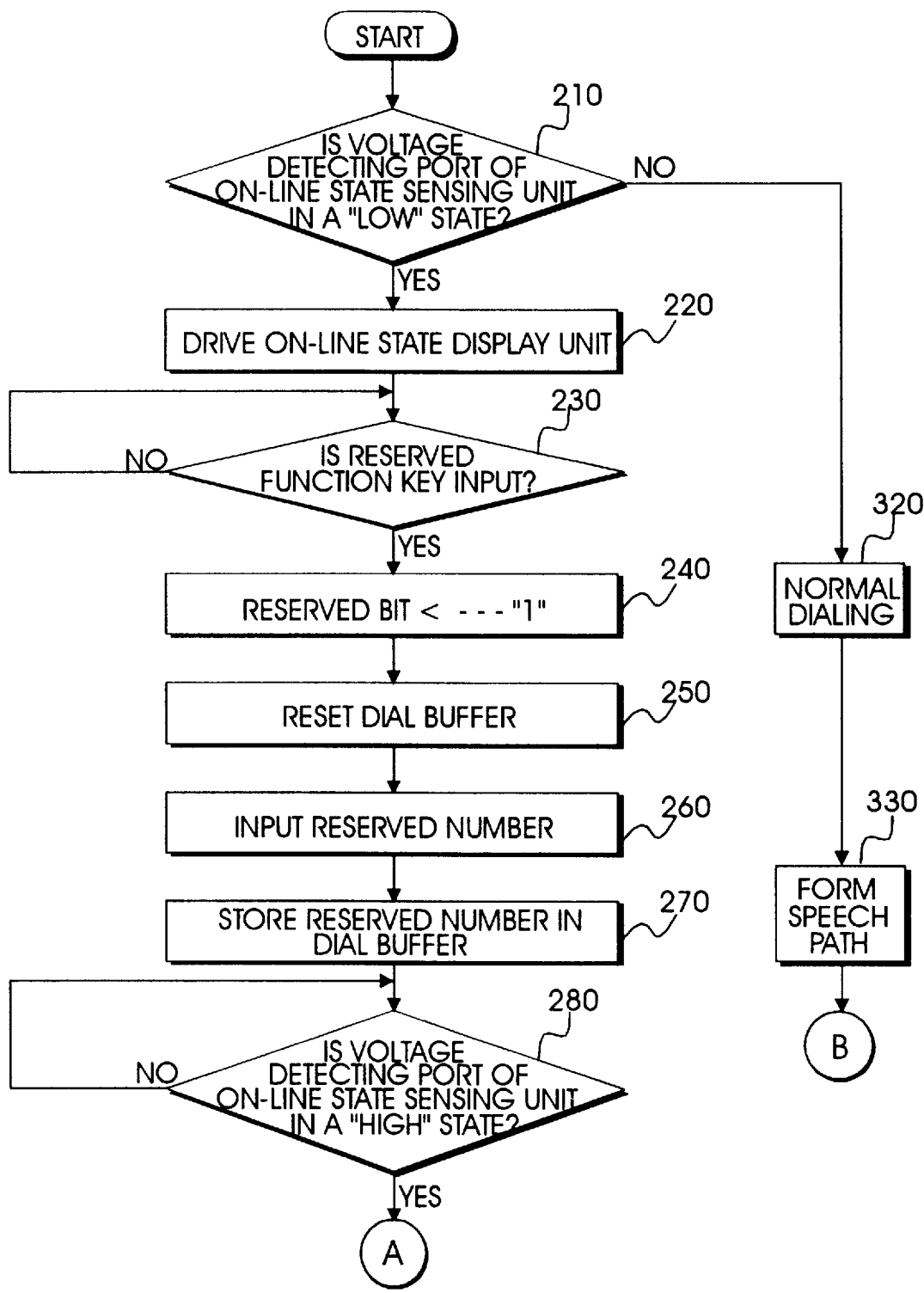
FIGS. 3A and 3B are flow charts illustrating a reserved speech path forming method for the general telephone in accordance with a second embodiment of the present invention.
Figure 3B:
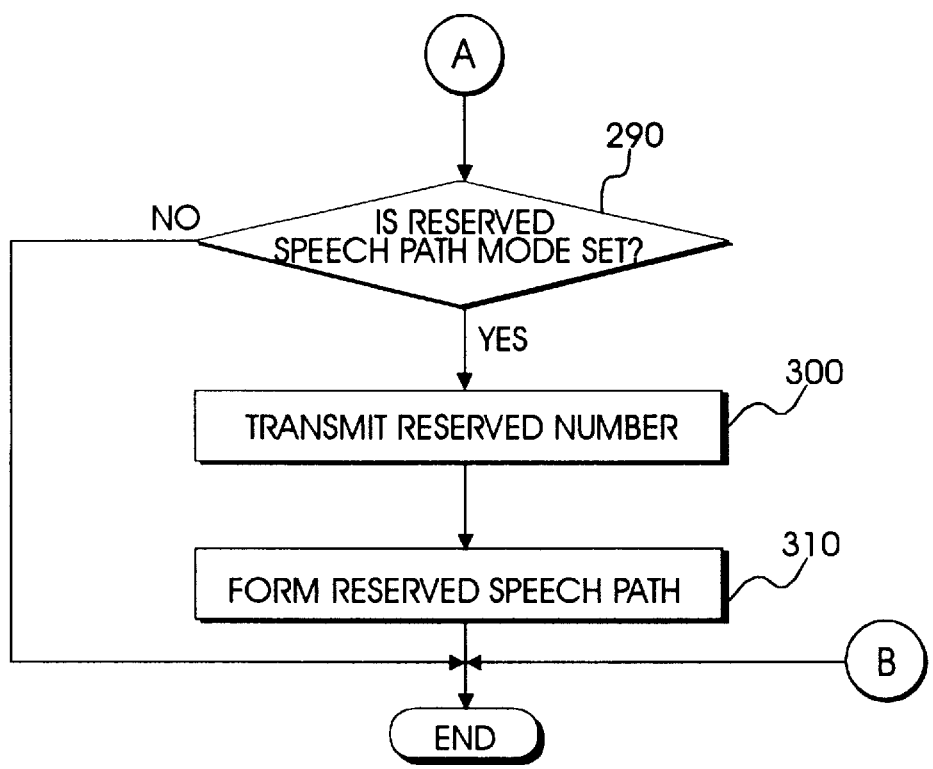

FIGS. 3A and 3B are flow charts illustrating a reserved speech path forming method for the general telephone within the parallel-connected telephone system according to a second embodiment of the present invention. According to FIG. 3, when a first telephone within the parallel-connected telephone system is in the on-line state, and the user of a second telephone within the system who desires to use his telephone inputs the reserved function key via key input unit 50, control unit 40 sets a reserved bit and enables the user of the second telephone to input a reserved telephone number for storage in the dial buffer of reserved number storage unit 70. Then, when use of the first telephone is completed, control unit 40 automatically transmits the reserved number and forms the reserved speech path.

The reserved speech path forming method in the parallel-connected telephone system according to the first embodiment of the present invention will now be described in detail with reference to FIGS. 1 and 2.

In step 100, control unit 40 determines whether a voltage detecting port of on-line state sensing unit 20 exhibits a binary "low" state indicating that another telephone within the system is in an on-line state. When the voltage detecting port of on-line state sensing unit 20 does not exhibit the binary "low" state, control unit 40 enables performance of a normal dialing operation in step 190, and then forms a speech path in step 200.

On the other hand, when the voltage detecting port of on-line state sensing unit 20 exhibits the binary "low" state in step 100, control unit 40 drives on-line state display unit 30 in step 110 to enable visual display of a message indicative of the on-line state of the other telephone. At this time, the user may input the reserved function key via key input unit 50.

In step 120, control unit 40 determines whether or not the reserved function key is input. When the reserved function key is input, control unit 40 sets the reserved speech path mode in step 130. In step 140, control unit 40 determines whether the voltage detecting port of on-line state sensing unit 20 exhibits a binary "high" state to detect when use of the other telephone is completed. When the voltage detecting port of on-line state sensing unit 20 exhibits the binary "high" state, control unit 40 proceeds to step 150.

In step 150, control unit 40 determines whether the reserved speech path mode is set. When it is determined in step 150 that the reserved speech path mode is not set, control unit 40 completes the method.

Alternatively, when it is determined that the reserved speech path mode is set, control unit 40 sends a dial tone to speaker 80 in step 160. In this instance, the user recognizes the dial tone generated from speaker 80, senses that the reserved speech path mode is set, and inputs a telephone number to be dialed via key input unit 50 in step 170. Control unit 40 receives and dials the input telephone number, and then forms the reserved speech path in step 180.

The reserved speech path forming method in the parallel-connected telephone system according to the second embodiment of the present invention will now be described in detail with reference to FIGS. 1, 3A and 3B.

In step 210, control unit 40 determines whether a voltage detecting port of on-line state sensing unit 20 exhibits a binary "low" state indicating that another telephone within the system is in an on-line state. When the voltage detecting port of on-line state sensing unit 20 does not exhibit the binary "low" state, control unit 40 enables performance of a normal dialing operation in step 320, and then forms a speech path in step 330.

On the other hand, when the voltage detecting port of on-line state sensing unit 20 exhibits the binary "low" state in step 210, control unit 40 drives on-line state display unit 30 in step 220 to enable visual display of a message indicative of the on-line state of the other telephone. At this time, the user may input the reserved function key via key input unit 50.

In step 230, control unit 40 determines whether or not the reserved function key is input. When the reserved function key is input, control unit 40 sets the reserved speech path mode by setting a reserved bit in step 240, and then resetting the dial buffer in step 250.

In step 260, the user inputs the reserved telephone number via key input unit 50, and in step 270, control unit 40 stores the reserved telephone number in the dial buffer of reserved number storage unit 70.

Next, in step 280, control unit 40 determines whether the voltage detecting port of on-line state sensing unit 20 exhibits a binary "high" state to detect when use of the other telephone is completed. When the voltage detecting port of on-line state sensing unit 20 exhibits the binary "high" state, control unit 40 proceeds to step 290.

In step 290, control unit 40 determines whether the reserved speech path mode is set. When it is determined in step 290 that the reserved speech path mode is not set, control unit 40 completes the method.

Alternatively, when it is determined that the reserved speech path mode is set, control unit 40 stores the control signal in reserved number storage unit 70 and dials the reserved telephone number stored in reserved number storage unit 70 for transmission over telephone lines (T,R) 10 via speech circuit unit 60. Then, in step 310, control unit 40 forms the reserved speech path and completes the method.

As described above, a reserved speech path forming method in a parallel-connected telephone system according to the present invention detects when another telephone within the system is being used, and displays a message indicating the on-line state of the other telephone. After use of the other telephone is finished, the present invention either enables the user to input a telephone number or automatically transmits a stored telephone number over the telephone lines to thereby form the reserved speech path. As a result, the inconvenience caused by a user repeatedly lifting his or her telephone handset from its hook in order to check the line status can be eliminated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for forming a reserved speech path in a parallel-connected telephone system comprising at least two telephone sets connected in parallel to a common telephone line, said method comprising the steps of:

determining, at a first telephone set, whether a second telephone set connected in parallel with said first telephone set to said common telephone line within said parallel-connected telephone system is in an on-line state;

permitting input of a reserved function key at said first telephone set without disconnecting said second telephone set from said common telephone line, when said second telephone set within said parallel-connected telephone system is in said on-line state;

setting said first telephone set in a reserved speech path mode in response to input of said reserved function key;

determining, at said first telephone set, whether said second telephone set shifts from said on-line state to an off-line state; and informing a user of said first telephone set of the availability of the common telephone line for dialing a telephone number and forming said reserved speech path, after said second telephone set within said parallel-connected telephone system shifts from said on-line state to said off-line state.

2. The method of claim 1, further comprised of said first telephone set providing a variable visual display of a message indicative of said on-line state of said second telephone set, when said second telephone set within said parallel-connected telephone system is in said on-line state.

3. The method of claim 1, further comprised of said informing the user of said first telephone set of the availability of the common telephone line by generating a dial tone to a speaker until the user dials the telephone number to form said reserved speech path.

4. A method for forming a reserved speech path in a parallel-connected telephone system comprising at least two telephone sets connected in parallel to a common telephone line, said method comprising the steps of:

determining, at a first telephone set, whether a second telephone set connected in parallel with said first telephone set to said common telephone line within said parallel-connected telephone system is in an on-line state;

permitting input of a reserved function key at said first telephone set without disconnecting said second telephone set from said common telephone line, when said second telephone set within said parallel-connected telephone system is in said on-line state;

setting said first telephone set in a reserved speech path mode in response to input of said reserved function key;

determining, at said first telephone set, whether said second telephone set shifts from said on-line state to an off-line state;

generating a dial tone via a speaker at said first telephone set to inform a user of said first telephone set of the availability of said common telephone line, when said second telephone set within said parallel-connected telephone system shifts from said on-line state to said off-line state;

permitting input of a telephone number to be dialed from said first telephone set via said common telephone line of a telephone network; and forming said reserved speech path after said telephone number is dialed via said common telephone line of said telephone network.

5. The method of claim 4, further comprised of said first telephone set providing a variable visual display of a message indicative of said on-line state of said second telephone set, when said second telephone set within said parallel-connected telephone system is in said on-line state.

6. A method for forming a reserved speech path in a parallel connected telephone system comprising at least two telephone sets connected in parallel to a common telephone line, said method comprising the steps of:

determining, at a first telephone set, whether a second telephone set connected in parallel with said first telephone set to said common telephone line within said parallel-connected telephone system is in an on-line state;

permitting input of a reserved function key at said first telephone set without disconnecting said second telephone set from said common telephone line, when said second telephone set within said parallel-connected telephone system is in said on-line state;

setting said first telephone set in a reserved speech path mode in response to input of said reserved function key;

permitting input of a reserved telephone number for storage and subsequent transmission in said first telephone set, while said first telephone set is set in said reserved speech path mode;

determining, at said first telephone set, whether said second telephone set shifts from said on-line state to an off-line state;

automatically dialing said reserved telephone number stored in said first telephone set via said common telephone line, after said second telephone set within said parallel-connected telephone system shifts from said on-line state to said off-line state; and forming said reserved speech path after said reserved telephone number is dialed via said common telephone line.

7. The method of claim 6, further comprised of said first telephone set providing a variable visual display of a message indicative of said on-line state of said second telephone set, when said second telephone set within said parallel-connected telephone system is in said on-line state.

8. The method of claim 6, further performing a normal dialing operation and forming a normal speech path, when said first telephone set determines that said second telephone set connected in parallel with said first telephone set to said common telephone line is in said off-line state.

9. A method for use in a parallel-connected telephone system comprising first and second telephone sets connected to a common telephone line, said method comprising the steps of:

determining, at said first telephone set, whether said second telephone set is in an on-line state;

permitting input of a reserved function key at said first telephone set without disconnecting said second telephone set from said common telephone line, when said second telephone set is in said on-line state;

setting said first telephone set to a reserved speech path mode in response to input of said reserved function key;

storing a reserved telephone number in said first telephone set; and enabling said first telephone set to automatically dial said reserved telephone number, when said second telephone set shifts from said on-line state to an off-line state.

10. The method of claim 9, further comprised of said first telephone set providing a variable visual display of a message indicative of said on-line state of said second telephone set, when said second telephone set is in said on-line state.

11. A method for use in a parallel-connected telephone system comprising first and second telephone sets connected to a telephone line, said method comprising the steps of:

determining, at said first telephone set, whether said second telephone set is in an on-line state;

permitting input of a reserved function key at said first telephone set without disconnecting said second telephone set from said telephone line, when said second telephone set is in said on-line state;

setting said first telephone set to a reserved speech path mode in response to input of said reserved function key; and transmitting a dial tone to said first telephone set and enabling a user of said first telephone set to input a telephone number to be dialed via a telephone network, when said second telephone set shifts from said on-line state to an off-line state.

12. The method of claim 11, further comprised of said first telephone set providing a variable visual display of a message indicative of said on-line state of said second telephone set when said second telephone set is in said on-line state.

13. A telephone device within a parallel-connected telephone system, said telephone device comprising:

first means for determining whether another telephone device connected to a common telephone line within said parallel-connected telephone system is in an on-line state; and second means for enabling input of a reserved function key without disconnecting said another telephone device from said common telephone line, when said first means determines that said another telephone device within said parallel-connected telephone system is in said on-line state, and setting said telephone device to a reserved speech path mode in response to input of said reserved function key, said second means then transmitting a dial tone and enabling a user of said telephone device to input a telephone number to be dialed via a telephone network, when said another telephone device within said parallel-connected telephone system shifts from said on-line state to an off-line state.

14. The telephone device of claim 13, further comprising a variable visual display of a message indicative of said on-line state of said another telephone device within said parallel-connected telephone system when said another telephone device within said parallel-connected telephone system is in said on-line state.

15. A telephone device within a parallel-connected telephone system, said telephone device comprising:

first means for determining whether another telephone device connected to a telephone line within said parallel-connected telephone system is in an on-line state; and second means for enabling input of a reserved function key without disconnecting said another telephone device from said telephone line within said parallel-connected telephone system when said first means determines that said another telephone device within said parallel-connected telephone system is in said on-line state, and enabling input and storage of a reserved telephone number in response to input of said reserved function key, said second means then automatically dialing said reserved telephone number via a telephone network, when said another telephone device within said parallel-connected telephone system shifts from said on-line state to an off-line state.

16. The telephone device of claim 15, further comprising a visual display of a message indicative of said on-line state of said another telephone device within said parallel-connected telephone system when said another telephone device within said parallel-connected telephone system is in said on-line state.

* * * * *